United States Patent [19]
Jayakumar et al.

[11] Patent Number: 5,951,663
[45] Date of Patent: Sep. 14, 1999

[54] METHOD AND APPARATUS FOR TRACKING BUS TRANSACTIONS

[75] Inventors: Muthurajan Jayakumar, Sunnyvale; William Wu, Cupertino; Len Schultz, Sunnyvale, all of Calif.

[73] Assignee: Intel Corporation, Santa Clara, Calif.

[21] Appl. No.: 08/992,609

[22] Filed: Dec. 17, 1997

[51] Int. Cl.⁶ .............................. G06F 13/00; G06F 13/42
[52] U.S. Cl. ......................... 710/107; 710/54; 710/118; 709/101
[58] Field of Search .......................... 714/748; 710/100, 710/112, 107, 48, 52, 54, 105, 118; 709/101

[56] References Cited

U.S. PATENT DOCUMENTS

| | | | |
|---|---|---|---|
| 5,535,345 | 7/1996 | Fisch et al. ............................... | 710/129 |
| 5,555,420 | 9/1996 | Sarangdhar et al. ...................... | 710/266 |
| 5,774,679 | 6/1998 | Kondo et al. ............................ | 710/105 |
| 5,870,567 | 2/1999 | Hausauer et al. ........................ | 710/101 |

*Primary Examiner*—Gopal C. Ray
*Attorney, Agent, or Firm*—Blakely, Sokoloff, Taylor & Zafman LLP

[57] ABSTRACT

A method and device for tracking a bus transaction between first and second agents coupled to a bus includes issuing a request for the transaction by the first agent, storing information regarding the transaction in a buffer, and deleting the information regarding the transaction from the buffer if the first agent receives an indication that the second agent will not issue a retry.

14 Claims, 4 Drawing Sheets

METHOD AND APPARATUS FOR TRACKING BUS TRANSACTIONS

BACKGROUND OF THE INVENTION

1. Field of the Invention

The invention relates to computer buses, and more specifically, to a method and apparatus for tracking bus transactions.

2. Description of Related Art

FIG. 1 illustrates a portion of a typical prior art computer system, such as a personal computer (PC), including one or more processors 10 and a chipset 12 coupled together by means of a processor bus 14. The chipset 12 is coupled to a memory device 15 such as a dynamic random access memory (DRAM) device and an input/output (I/O) bus 16.

A bus is like a highway on which data travel within a computer. It is simply a channel over which information flows between two or more devices. A bus normally has access points, or places into which a device can tap to become attached to the bus, and devices on the bus can send to, and receive information from, other devices. The processor bus 14 is the bus that the chipset 12 and the processors 10 use to communicate with each other. Computer systems also typically include at least one I/O bus 16, such as a peripheral component interconnect (PCI) bus, which is generally used for connecting performance-critical peripherals to the memory 15, chipset 12, and processor 10. For example, video cards, disk storage devices, high-speed network interfaces generally use a bus of this sort. PCs typically also include additional I/O buses, such as an industry standard architecture (ISA) bus, for slower peripherals such as mice, modems, regular sound cards, low-speed networking, and also for compatibility with older devices.

Each transaction initiated on the processor bus 14 goes through three general stages: the arbitration phase, the address phase, and the data phase. For a component, or agent, connected to the bus 14 to initiate a transaction on the bus 14, the agent must obtain "ownership" of the bus 14. This happens during the arbitration phase, where the agent initiating the transaction, known as the requesting agent, signals that it wants to use the bus 14. Once the requesting agent acquires bus ownership, it sends an address out on the bus 14 during the address phase that identifies the target of the transaction —the target agent. The other agents on the bus 14 receive the address and determine which of them is the target agent. Finally, during the data phase, the requesting agent waits for the target agent to provide the requested read data or to accept the write data.

These general stages of a bus transaction may be further divided into additional phases on more complex buses. These phases, for example, may include the following: arbitration phase, request phase, error phase, snoop phase, response phase, and data phase. The bus may be divided into groups of signals that generally correspond to the transaction phases, each of which is only used during the respective phase of a transaction.

Further, the bus may be designed to allow various phases of several different bus transactions to occur simultaneously to improve bus performance. This is known as "pipelining." When a request agent finishes with the request phase signal group for a specific transaction, it relinquishes control of that signal group and takes ownership of the signal group for the next phase. For example, once the request agent has issued its transaction request and is ready to check the error phase signals, it no longer requires the use of the request phase signals. It relinquishes control of the request phase signals and allows another transaction to be initiated. Thus, one transaction may be in the error phase while another transaction is simultaneously in the request phase.

Specific bus transactions, such as data reads or writes, may take a relatively long time to complete, or the target agent may be busy, and therefore, not available to immediately complete the request. In cases such as these, the target agent may choose to defer responding to the transaction request to a later time, in which case the target agent is called a deferring agent. Further, the target agent may assert a retry signal, notifying the requesting agent that the target agent cannot handle the transaction now, and the requesting agent should try the transaction again later.

The requesting agent keeps track of each transaction it initiates. Typically, the requesting agent records transaction information, such as the target agent's address, transaction type, transaction phase, etc., in a buffer. A typical transaction proceeds through the various phases and completes, then the transaction information is removed from the buffer, making room for additional transactions.

If a transaction is deferred, the transaction information is kept in the buffer until the transaction completes. For example, in a memory read transaction issued by a processor 10, the processor 10 may provide an identification of the request type and the memory address from which to read the data during the request phase. If the target agent (the memory controller of the chipset 12) cannot handle the request immediately, or if the transaction will take a relatively long time to complete, it may defer the request. The chipset 12 may complete the memory read at a later time, and then initiate another transaction to provide the data to the processor 10. The information regarding the original memory read transaction must be stored in the buffer until the chipset 12 provides the data in the subsequent bus transaction, so that the processor can determine with which transaction the received data is associated.

Processor performance typically has outpaced memory performance, increasing the latency in memory accesses and resulting in more deferred transactions. The buffer space for storing deferred transaction information is limited. If the buffer fills up, the processor 10 stalls, waiting for deferred transactions to complete before additional transactions may be initiated. One attempt to reduce the effect of this latency is to increase the buffer size such that additional deferred bus transactions may be tracked. The increased buffer size, however, has the undesirable effect of increasing the physical size of the processor package, and in turn, increasing the cost of the processor.

The present invention addresses the above discussed, and other, shortcomings of the prior art.

SUMMARY OF THE INVENTION

In one aspect of the present invention, a method for tracking a bus transaction between first and second agents coupled to a bus includes issuing a request for the transaction by the first agent, storing information regarding the transaction in a buffer, and deleting the information regarding the transaction from the buffer if the first agent receives a first indication that the second agent will not issue a retry.

In another aspect of the invention, a system for tracking a bus transaction includes a first agent coupled to the bus, with the first agent including a buffer and being adapted to issue a transaction request and store information regarding the transaction in the buffer. A second agent is also coupled to the bus and adapted to provide a first indication that a retry will not be issued in response to the transaction request. The first agent is adapted to delete the information regarding the transaction from the buffer in response to the first indication.

BRIEF DESCRIPTION OF THE DRAWINGS

Other objects and advantages of the invention will become apparent upon reading the following detailed description and upon reference to the drawings in which.

Figure 1:
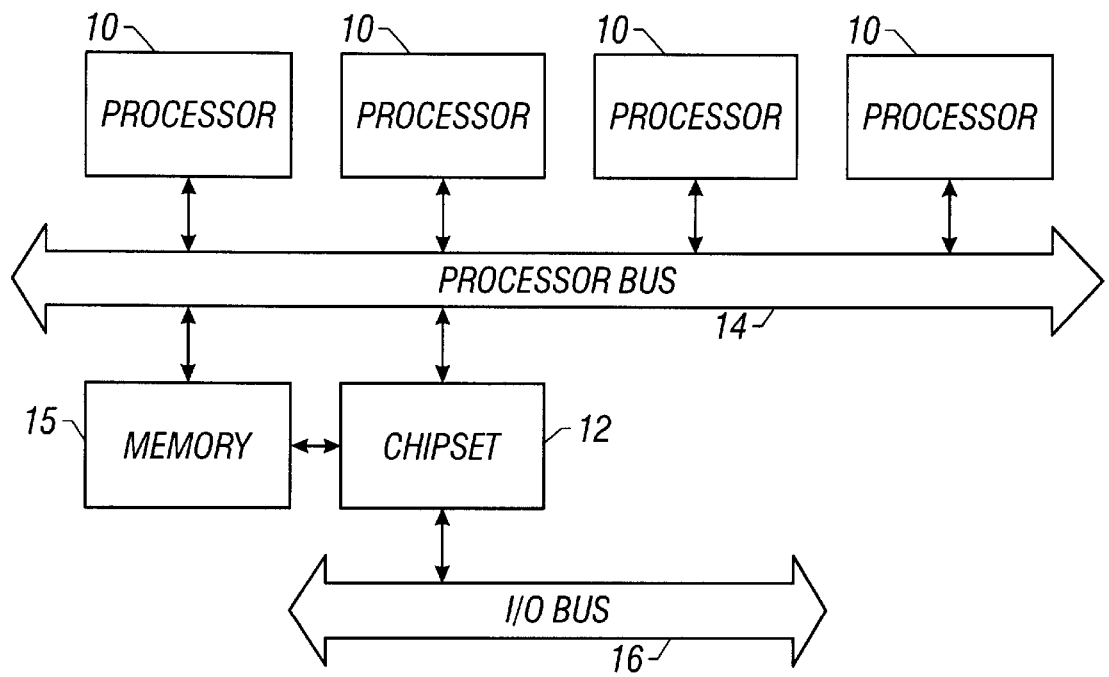
FIG. 1 is a block diagram illustrating a prior art computer system employing a PCI local bus.

While the invention is susceptible to various modifications and alternative forms, specific embodiments thereof have been shown by way of example in the drawings and are herein described in detail. It should be understood, however, that the description herein of specific embodiments is not intended to limit the invention to the particular is forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
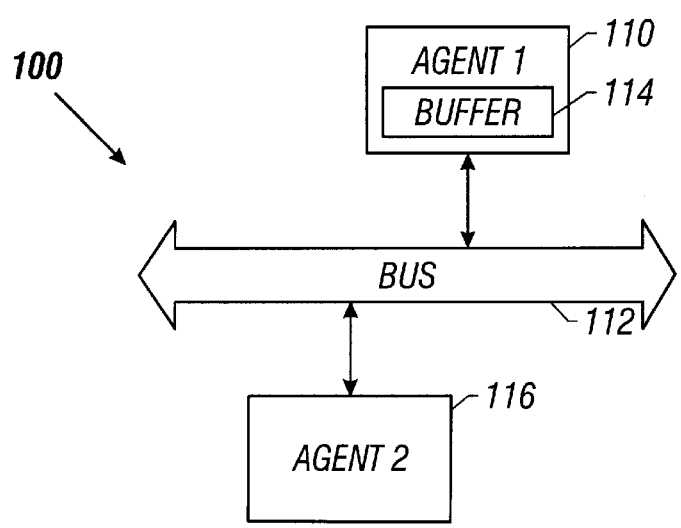
FIG. 2 is a block diagram illustrating a portion of a computer system employing an embodiment of the present invention.

FIG. 2 is a block diagram illustrating a portion of a computer system 100 employing an embodiment of the present invention. The computer system 100 includes a first agent 110 that is coupled to a bus 112. The first agent 110 includes a buffer 114 for storing information regarding bus transactions. A second agent 116 is also coupled to the bus 112.

Figure 3:
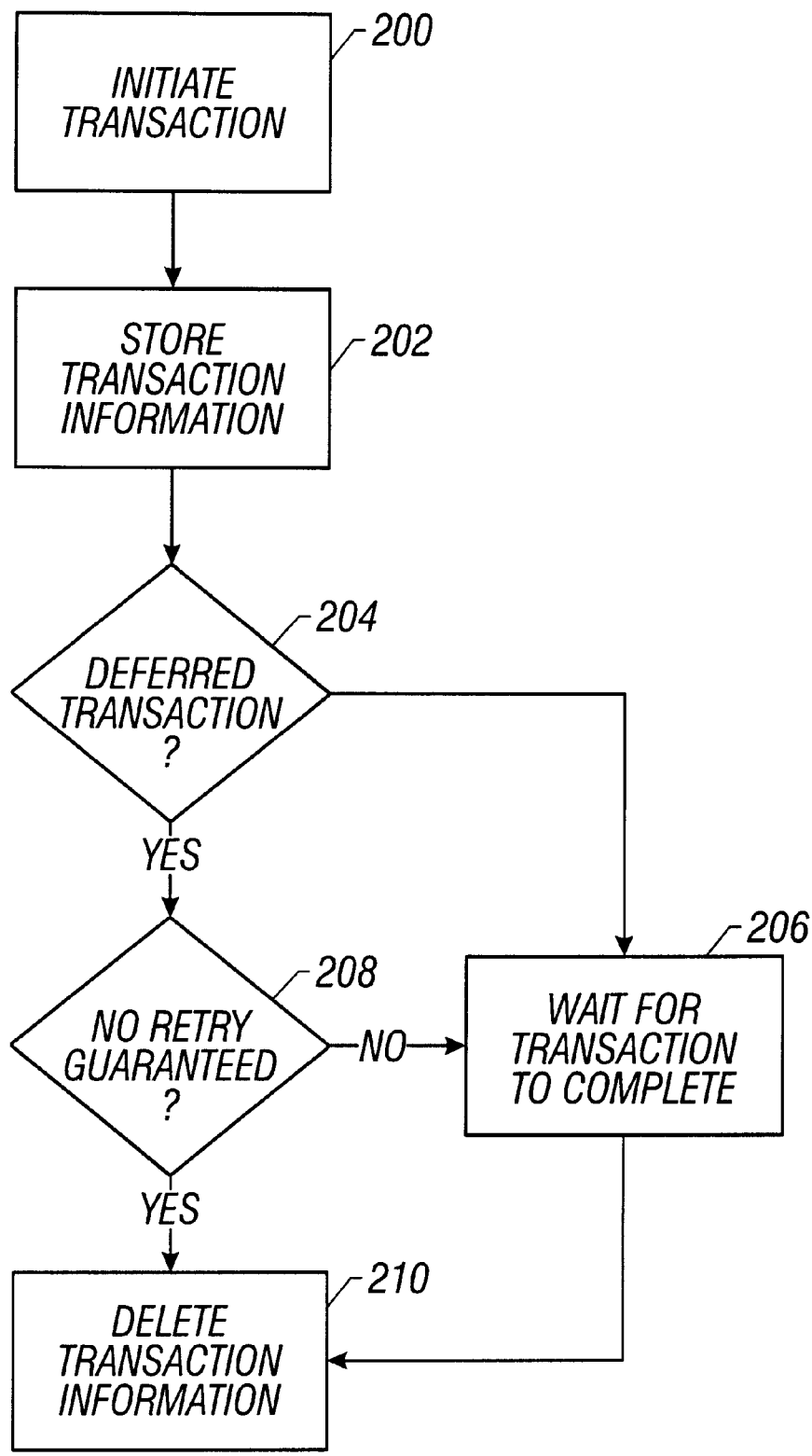
FIG. 3 is a flow diagram illustrating an embodiment of a method in accordance with the present invention.

FIG. 3 is a flow diagram illustrating an embodiment of a method in accordance with the present invention. Referring to FIG. 3 in conjunction with FIG. 2, the first agent 110 initiates a bus transaction in block 200. The second agent 116 is the target of the request issued in block 200. In block 202, information regarding that transaction is stored in the buffer 114. The information stored in the buffer 114 allows the first agent 110 to track each transaction as it proceeds through the various bus transaction phases. If the second agent 116 will take a relatively long time to complete the transaction, it may defer the transaction.

The first agent 110 determines whether the second agent 116 is deferring the transaction in decision block 204. If the transaction is not deferred, it continues through the various transaction phases in block 206 until the transaction is complete. A deferred transaction is illustrated below.

Consider, for example, a memory read transaction initiated by the first agent 110 targeted at the second agent 116. If the second agent 116 defers the transaction, it is telling the first agent 110 that the second agent 116 will complete the transaction at a later time. Hence, the first agent 110 may relinquish ownership of the bus 112 and not complete that transaction at that time. When the second agent 116 finishes retrieving the requested data, it will initiate a transaction, referred to as a deferred response, to provide the data to the first agent 110. Even though the first agent 110 relinquished ownership of the bus 112 for that transaction, it kept the information regarding the transaction in the is buffer 114. The first agent 110 may then use the information stored in the buffer 114 to match-up the data received from the second agent 116 during the deferred response with the original transaction.

If the second agent 116 indicates that it is deferring the transaction in block 204, it may further issue a "retry," notifying the first agent 110 that it cannot handle the request transaction now, and the first agent 110 should try the transaction again later. If the second agent 116 issues a retry, the first agent 110 may relinquish ownership of the bus 112, then retry the transaction at a later time. The information regarding the transaction is kept in the buffer 114 to be used in the subsequent retry transaction.

In an embodiment in accordance with the present invention, the second agent 116 may provide an indication that it will not issue a retry for the transaction. In decision block 208, the first agent 110 determines whether the second agent 116 has so indicated. If the second agent 116 does not provide an indication that no retry will be issued, the first agent 110 keeps the transaction information in the buffer 114, because it may use the information in a subsequent retry transaction if the second agent 116 issues a retry. Therefore, the first agent 110 waits until the second agent 116 indicates that the transaction has completed in block 206 before deleting the transaction in block 210. If the second agent 116 "guarantees" that it will not issue a retry in block 208, the first agent 110 immediately deletes the transaction information from the buffer 114 in block 210. This allows the first agent 110 to deallocate the buffer 114 space sooner, making room for additional deferred transactions, thus reducing the effects of system latency.

Figure 4:
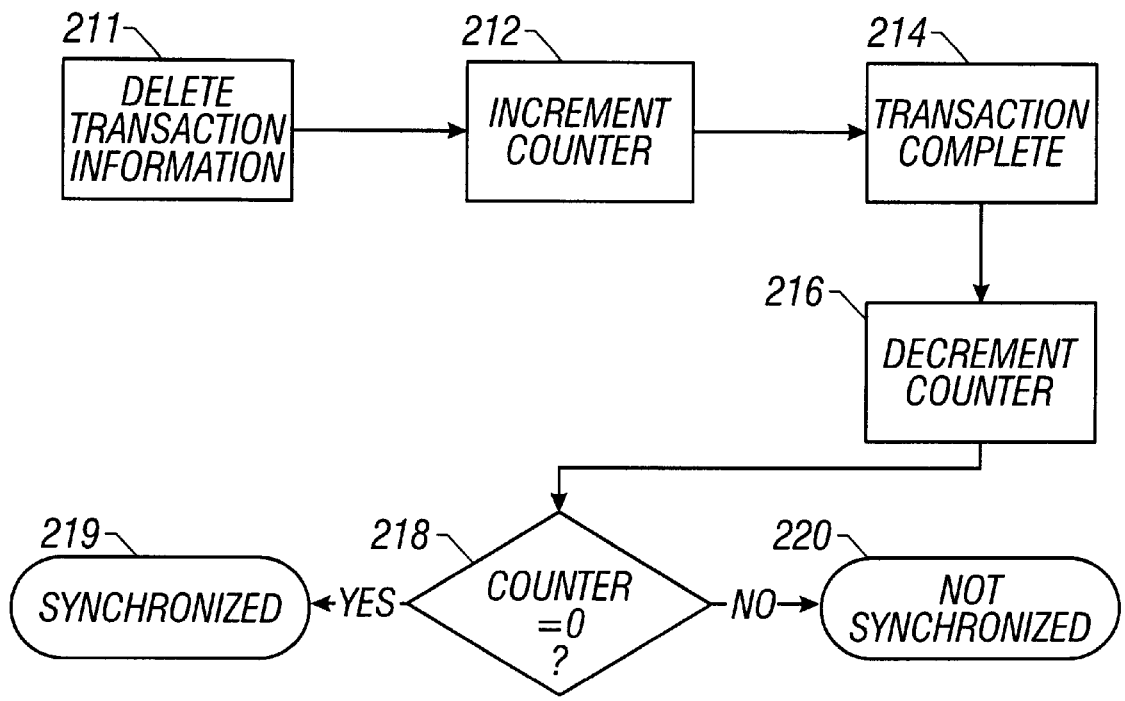
FIG. 4 is a flow diagram illustrating another embodiment of a method in accordance with the present invention.

FIG. 4 illustrates a further embodiment of a method in accordance with the invention. In the embodiment illustrated in FIG. 4, it is assumed that the first agent 110 has received the indication guaranteeing that the second agent 116 will not issue a retry (see block 208 in FIG. 3), so the first agent 110 immediately deallocates the buffer 114 space, removing the information regarding the transaction to free-up buffer 114 space in block 211. In block 212, the first agent 110 increments a counter. when the first agent 110 receives an indication from the second agent 116 that the original transaction is complete in block 216, the first agent 110 decrements the counter in block 218.

This embodiment may be employed in situations where a first group of instructions must be complete before a second group commences. Each time the second agent 116 guarantees that it will not retry a transaction associated with the first group of instructions, the buffer 114 space is deallocated (block 211) and the counter is incremented (block 212).

Each time the second agent 116 indicates that it has completed one of the transactions (block 214), the counter is decremented in block 216. In decision block 218, the first agent 110 checks the status of the counter. If the counter reaches 0, the first agent 110 knows that it has reached the point of synchronization (block 219), with the first group of instructions complete. It then can commence the next group of instructions. If the counter is greater than 0 in block 218, the deferred transactions are not synchronized (block 220). As long as the counter is greater than 0, the first agent 110 knows that there are outstanding transactions in the first group.

Figure 5:
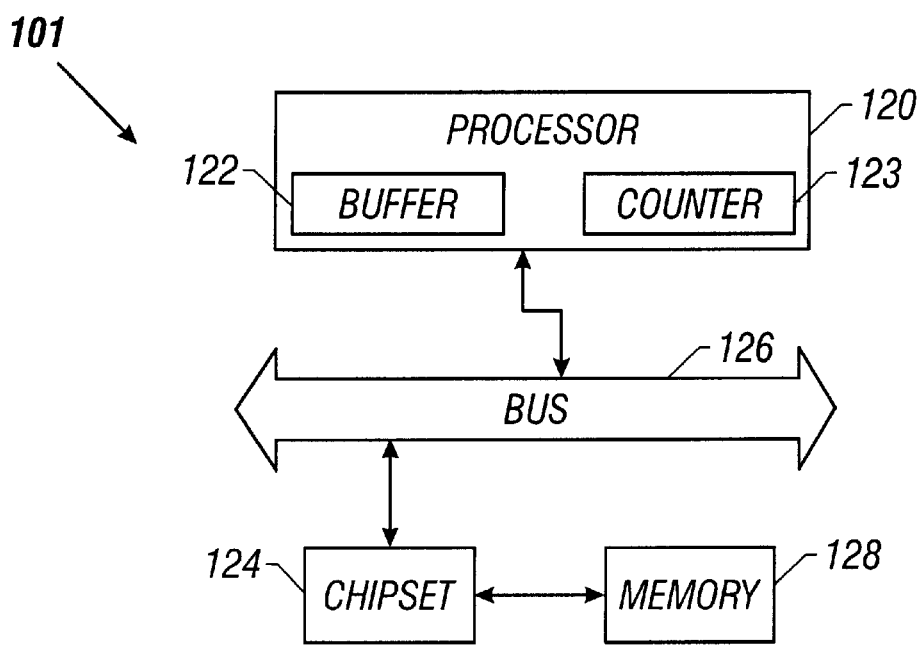
FIG. 5 is a block diagram of a computer system employing an embodiment in accordance with the present invention.
Figure 6:
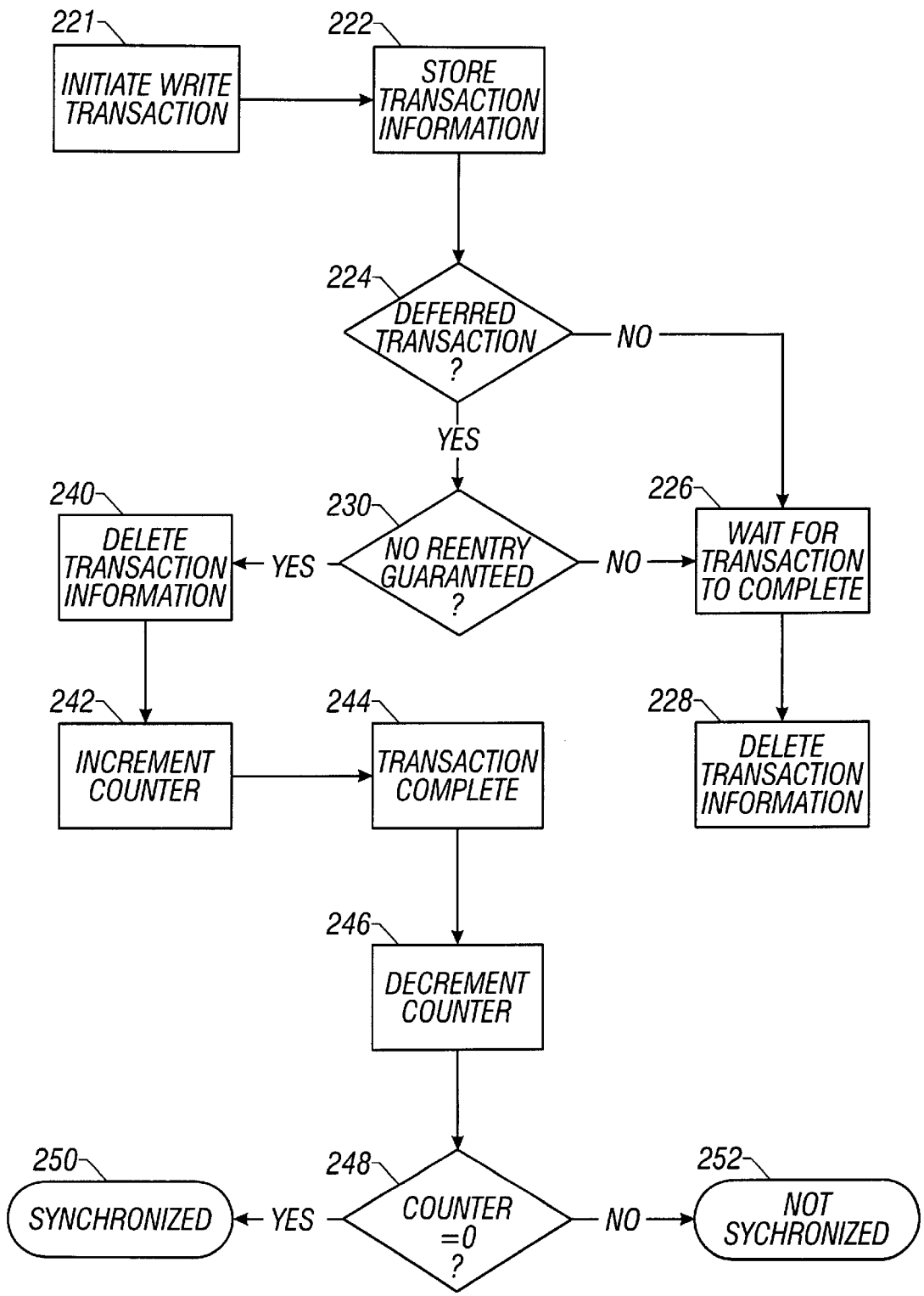
FIG. 6 is a flow diagram illustrating a particular embodiment in accordance with the present invention.

A particular embodiment in accordance with the present invention is illustrated in FIG. 5 and FIG. 6. Referring to FIG. 5, a portion of a computer system 101 is shown is having a processor 120 including a buffer 122 and a counter 123. The processor 120 is coupled to a chipset 124 via a bus 126. The processor 120 may be any conventional general purpose single- or multi-chip microprocessor such as a Pentium® processor, a Pentium® Pro processor, or an 8051 processor available from Intel Corp.; a MIPS® processor available from Silicone Graphics Inc.; a Power PC® processor available from Motorola, Inc.; an ALPHA® processor available from Digital Equipment Corp.; or the like. FIG. 5 illustrates the computer system 101 with a single processor 120; however, the present invention is not limited to single processor systems. The present invention may apply to systems having any number of processors 120. The chipset 124 is further coupled to a memory device 128, such as a dynamic random access memory (DRAM) device.

Turning now to FIG. 6, a flow diagram of an embodiment of a method in accordance with the present invention is illustrated in terms of a memory write transaction. In block 221, the processor 120 initiates a memory write to a location in the memory device 128 by proceeding through the various transaction phases as appropriate for the specific bus 126 to which the processor 120 is coupled. The target of the memory write transaction is the memory controller (not shown) residing in the chipset 124. In block 222, information regarding the memory write transaction is stored in the buffer 122. The information stored in the buffer 122 allows the processor 120 to track each bus transaction as it proceeds through its various phases. Moreover, if the transaction is deferred, the information may be used to associate a deferred reply transaction with the original bus transaction. Further, the information stored in the buffer 122 may be used in is a subsequent retry transaction initiated by the processor 120.

In block 224, the chipset 126 indicates whether the transaction request is being deferred. If the chipset 124 can immediately handle the transaction in a timely manner, it does not defer the transaction, and the processor 120 continues with the memory write transaction in block 226 until it is complete. Once the chipset 124 indicates that the data have been received by the memory device 128, the processor 120 removes the information regarding the write transaction from the buffer 122 in block 228.

If the chipset 124 indicates that the transaction is being deferred in block 224, it may provide an indication guaranteeing that it will not issue a retry. In block 230, the processor 120 determines whether the chipset 124 guarantees that it will not issue a retry. If the chipset 124 does not guarantee that it will not issue a retry in block 230, the processor 120 waits until the transaction completes in block 226, then removes the information from the buffer 122 in block 228. If the chipset 124 indicates that it will not issue a retry, the processor immediately deletes the information from the buffer 122 in block 240, thus freeing up buffer space for additional transactions. In a memory write transaction, once the data are provided to the bus 126, the information regarding the specific transaction is only required if a retry is issued (there are no data to be received and associated with a processor-initiated transaction). Therefore, if the processor 120 is assured that the transaction will be completed, it does not need to tie up the buffer 122 space with information regarding the transaction.

After the information regarding the deferred write transaction is deleted from the is buffer 122 in block 240, the processor 120 increments the counter 123 in block 242, thereby counting the number of such "guaranteed" deferred transactions. When the processor 120 receives an indication that an earlier guaranteed deferred transaction has completed in block 244, it decrements the counter 123 in block 246. In block 248, the processor 120 checks the status of the counter 123. If the counter 123 equals 0, the guaranteed deferred transactions are synchronized (block 250), and if the counter 123 is greater than 0, the transactions are not synchronized (block 252). If subsequent instructions to be executed by the processor 120 require sequential execution, the processor 120 must wait until the outstanding transactions have synchronized (block 250).

Thus, the present invention provides a method and apparatus for tracking bus transactions that reduces the effects of system latency. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for tracking transactions on a bus comprising the acts of:

initiating a bus transaction by a first agent;

storing information regarding the transaction in a buffer;

providing a first indication that a second agent will not issue a retry; and deleting the information regarding the transaction from the buffer in response to the first indication.

2. The method of claim 1 further comprising the act of incrementing a counter when the information regarding the transaction is deleted from the buffer.

3. The method of claim 2 further comprising the acts of;

providing a second indication that the transaction is complete; and decrementing the counter in response to the second indication.

4. The method of claim 3 further comprising the act of executing subsequent bus transactions if the counter value is 0.

5. The method of claim 1 wherein the issuing a request act comprises issuing a request for a write transaction.

6. The method of claim 5 further comprising the act of transmitting write data to the bus.

7. A computer system comprising:

a bus;

a first agent coupled to the bus, the first agent including a buffer and being adapted to issue a transaction request and store information regarding the transaction in the buffer;

a second agent coupled to the bus, the second agent being adapted to provide a first indication that a retry will not be issued in response to the transaction request; and the first agent adapted to delete the information regarding the transaction from the buffer in response to the first indication.

8. The computer system of claim 7 further comprising a counter accessible by the first agent, wherein the first agent is further adapted to increment the counter when the information regarding the transaction is deleted from the buffer.

9. The computer system of claim 8 wherein the second agent is further adapted to provide a second indication that the transaction is complete; and wherein the first agent is adapted to decrement the counter in response to the second indication.

10. The computer system of claim 7 wherein the first agent is a processor.

11. The computer system of claim 7 wherein the second agent is a chipset.

12. A method for allowing memory write transactions beyond buffer limitations comprising the acts of:

initiating a memory write transaction to a memory controller by a processor;

storing information regarding the memory write transaction in a buffer;

providing a first indication by the memory controller that the transaction will not be retried; and deleting the information regarding the memory write transaction in response to the first indication.

13. The method of claim 12 further comprising the act of incrementing a counter when the processor deletes the information regarding the memory write transaction.

14. The method of claim 13 further comprising the acts of providing a second indication by the memory controller that the memory write transaction is complete; and decrementing the counter in response to the second indication.

* * * * *

UNITED STATES PATENT AND TRADEMARK OFFICE
CERTIFICATE OF CORRECTION

PATENT NO. : 5,951,663  
DATED : September 14, 1999  
INVENTOR(S) : Jayakumar et al.

Page 1 of 1

It is certified that error appears in the above-identified patent and that said Letters Patent is hereby corrected as shown below:

Column 5,  
Line 15, delete second occurrence of "is".  
Line 46, delete "is".

Column 6,  
Line 10, delete "second occurrence of "is".

Signed and Sealed this

Tenth Day of June, 2003

JAMES E. ROGAN  
*Director of the United States Patent and Trademark Office*